United States Patent [19]
Robinson et al.

[11] Patent Number: 6,032,219
[45] Date of Patent: Feb. 29, 2000

[54] SYSTEM AND METHOD FOR BUFFERING DATA

[75] Inventors: Stephen C. Robinson, Olathe, Kans.; Darin J. Beesley, Kansas City, Mo.; Thomas H. Walters, Gardner, Kans.

[73] Assignee: Garmin Corporation, Taiwan

[21] Appl. No.: 08/904,638

[22] Filed: Aug. 1, 1997

[51] Int. Cl.[7] ...................................................... G06F 12/00
[52] U.S. Cl. ............................... 711/1; 711/168; 711/170; 711/156
[58] Field of Search ................................ 711/1, 168, 170, 711/156, 4, 118, 103, 114; 710/53, 56, 74, 21; 709/300, 303, 231; 705/32

[56] References Cited

U.S. PATENT DOCUMENTS

| | | | |
|---|---|---|---|
| 4,716,522 | 12/1987 | Funabashi et al. | 710/56 |
| 4,843,544 | 6/1989 | DuLac et al. | 710/53 |
| 5,109,500 | 4/1992 | Iseki et al. | 710/74 |
| 5,517,253 | 5/1996 | De Lange | 348/513 |
| 5,553,261 | 9/1996 | Hasbun et al. | 711/103 |
| 5,581,790 | 12/1996 | Sefidvash | 710/34 |
| 5,586,264 | 12/1996 | Belknap et al. | 709/231 |
| 5,761,417 | 6/1998 | Henley et al. | 709/231 |
| 5,802,366 | 9/1998 | Row et al. | 709/303 |
| 5,909,672 | 6/1999 | Madore et al. | 705/32 |

*Primary Examiner*—John W. Cabeca
*Assistant Examiner*—Fred F. Tzeng
*Attorney, Agent, or Firm*—Shook, Hardy & Bacon, L.L.P.

[57] ABSTRACT

A system for buffering data has a processor connected to a memory for storing mass data, connected to a single buffer having a plurality of buffer storage locations in a chain, and connected to a plurality of counters, wherein each counter corresponds to one of the buffer storage locations. The processor selects a sector of memory containing desired data associated with an open file, scans the buffer storage locations to determine whether the data is in the buffer and, when the data is not within the buffer, reads the data from the selected sector of memory into a selected buffer storage location that is unallocated to an open file. The processor then points to that allocated buffer storage location, so that the data can be retrieved from the buffer for processing. As additional data is desired that is not found in the buffer, the buffer storage location allocated to the open file is de-allocated and, if not allocated to any other open files, moved to the beginning of the chain of buffers. The sector of data containing the desired data is then read into a selected buffer that is not allocated to an open file, preferably the last unallocated buffer in the chain of buffers. In accordance with the present invention, a buffer storage location can be allocated to multiple open files. De-allocation of a buffer storage location from an open file will not cause the buffer storage location to be moved to the beginning of the chain when the buffer storage location is allocated to one or more other open files. When data within a buffer storage location has been modified, prior to de-allocation of that buffer storage location with respect to an open file, the processor writes the data, including the modifications, back to the associated sector in mass memory. In one embodiment, the system of the present invention is incorporated in a portable electronic device including a keyboard and a display, and a housing for housing the keyboard, display, processor, buffer, and memory. In a preferred embodiment, the portable electronic device is a navigation aid and selected data is map data.

19 Claims, 5 Drawing Sheets

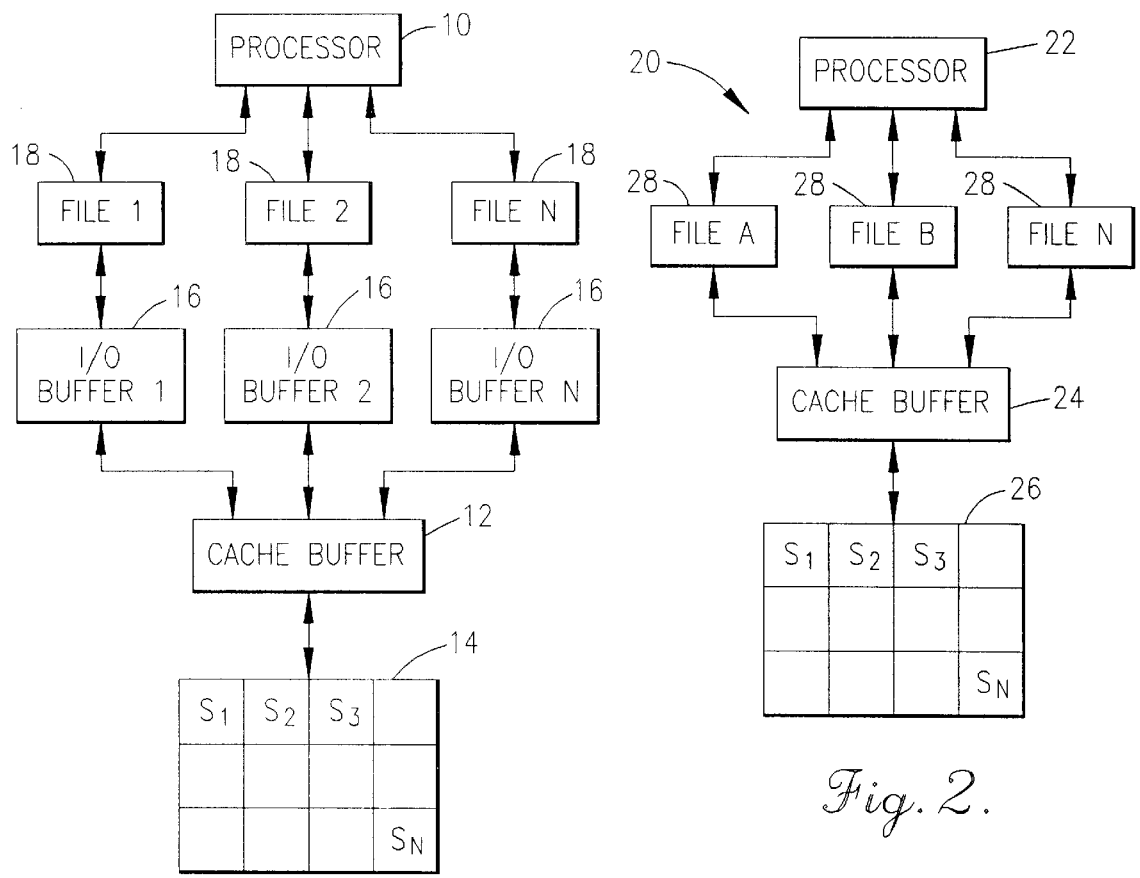
Fig. 1.
PRIOR ART
Fig. 2.
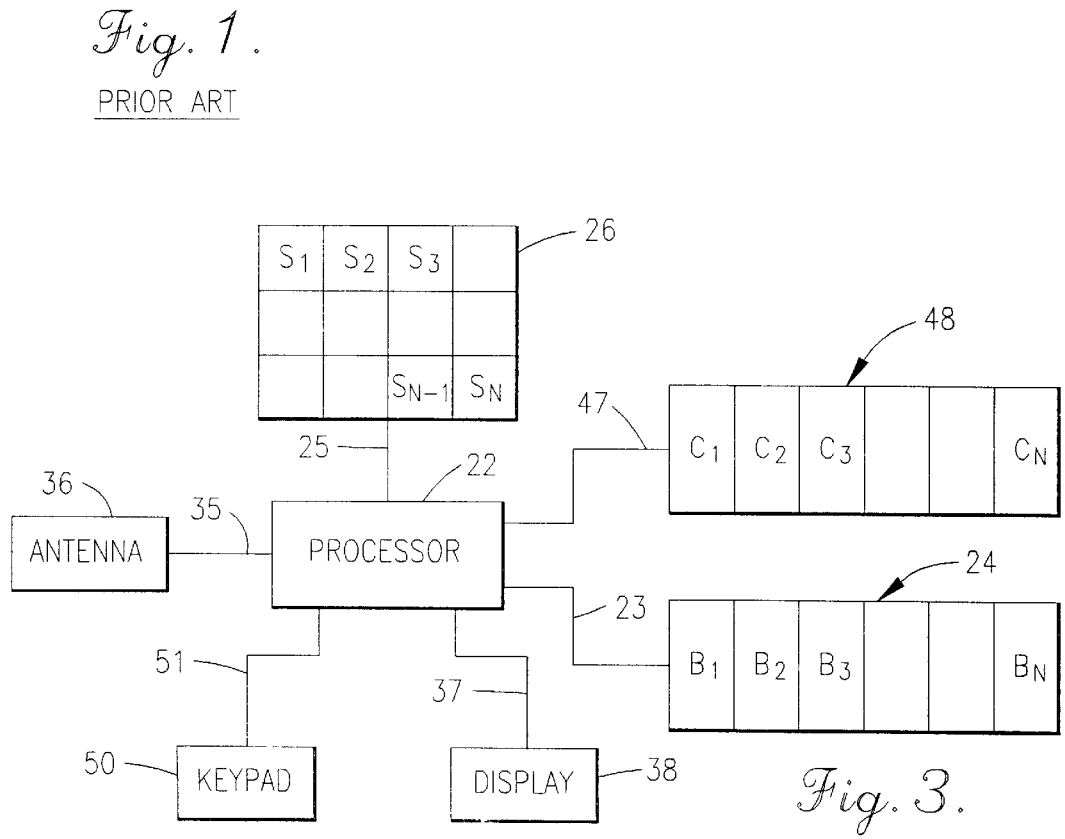
Fig. 3.

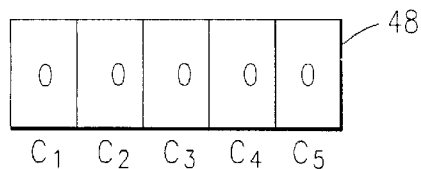
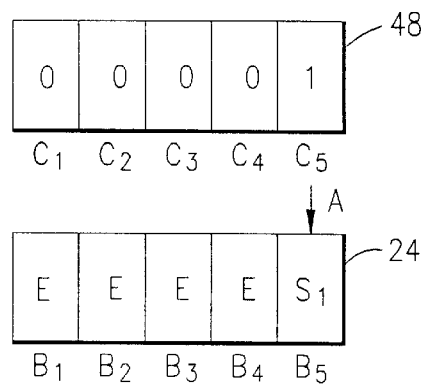
Fig. 5a.  Fig. 5b.
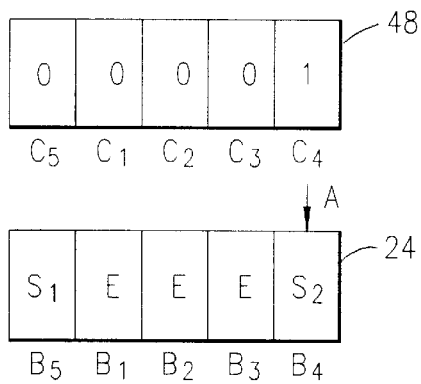
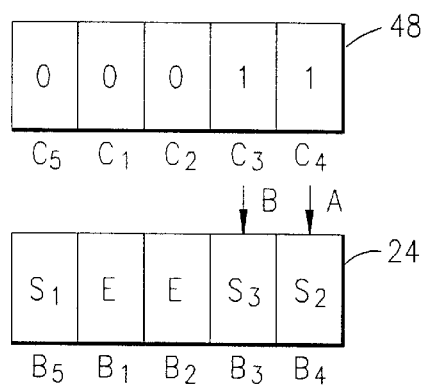
Fig. 5c.  Fig. 5d.
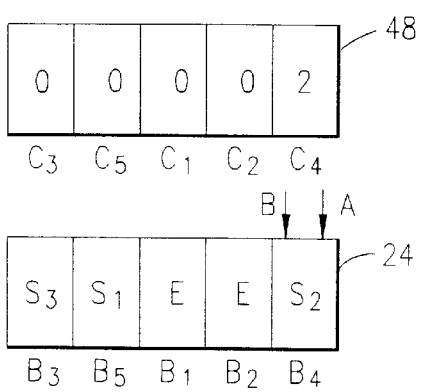
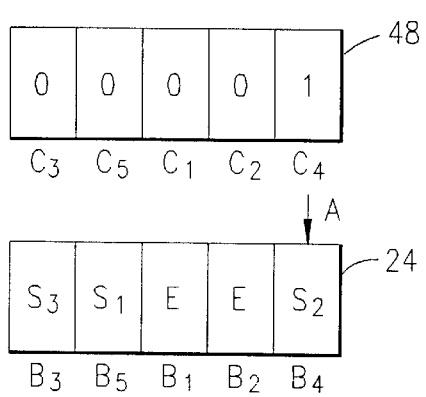
Fig. 5e.  Fig. 5f.

SYSTEM AND METHOD FOR BUFFERING DATA

BACKGROUND OF THE INVENTION

1. Field of the Invention

The present invention is generally directed to a method and system for managing the flow of data within the system. More particularly, the present invention is directed to a method and system for buffering data.

2. Description of the Related Art

Many conventional computers and electronic processing systems require quick access to selected data stored in mass memory. Typically, mass memory devices for storing large quantities of data are organized in sectors. Accessing data from these sectors of memory can be undesirably slow, particularly when the memory device is a disc or CD ROM product, as is often the case.

In order to improve retrieval of data from mass memory storage, input/output systems, and particularly buffering techniques, have been proposed for minimizing repetitive access to the mass data storage unit. Such systems implement a single input/output (I/O) buffer for each file to be opened. Particularly, a processor in such systems determines that data within a particular sector is needed, and will retrieve that data into the I/O buffer. Each time the system desires access to data within a particular file, the processor will determine whether the desired data is already in the I/O buffer. If the desired data is within the I/O buffer, then the data required will be retrieved directly from the I/O buffer. When, however, the required data is not within the I/O buffer, the complete sector of data containing the desired data is retrieved from the mass data storage unit. As will be appreciated, the ability to retrieve required data directly from the buffer, which is typically random access memory (RAM), without having to access the mass data storage unit, greatly speeds processing time. However, in most operations, it will typically be necessary to sequentially or periodically access data from a sector other than the sector stored in the I/O buffer. The need to repeatedly access data from mass memory storage requires repeated flushing of the I/O buffer to make space for new data, which itself must be retrieved, thereby greatly reducing system processing speed.

In an effort to improve data management and processing speed in systems involving mass data storage, systems with a second buffer, known as a cache buffer and software, have been implemented. In such systems, an I/O buffer of an open file communicates with a cache buffer such that, when the processor requires data other than that which is stored in the I/O buffer, processor scans the cache buffer to determine if the desired sector of data is already within the cache buffer. When the desired data is present in the cache buffer, it is handed directly from the buffer to the processor without the need to access the mass data storage unit. When the desired data is not within the cache buffer, the processor retrieves the required sector of data from the mass memory storage device. A certain number of sectors of previously used data are maintained in the cache buffer in an effort to minimize the time spent accessing the mass data storage unit during subsequent processing.

FIG. 1 illustrates a portion of a system utilizing a conventional cache buffer. Once a file, such as File 1 for instance, is opened, the processor determines whether the buffer associated with File 1 (e.g., I/O buffer 1) has data that is desired stored therein. If the data is stored within the file's associated I/O buffer, the desired data can be extracted from the I/O buffer and utilized. When, however, the desired data is not found within the associated I/O buffer of the open file, the processor scans the cache buffer to determine whether the desired data is already within the cache buffer. In practice, each of the I/O buffer and cache buffer have associated software code, I/O code and cache code, respectively. When the desired data is present within the cache buffer, the cache code causes the desired data to be sent to the I/O buffer, where it is in turn handed to the I/O code for use in the process being undertaken. When, however, the desired data is not found by the cache code within its cache buffer, the cache code must extract the desired data from the appropriate sector $(S_1, S_2, \ldots S_n)$ and store the sector of data within the cache buffer. The cache code then transmits the data to the I/O buffer, where it is handed to the I/O code for use in the process being conducted. As will be understood, the extracted sector of data is maintained within the cache buffer such that subsequent operations requiring the same data can access the cache buffer, without the necessity to access the mass data storage unit. It should be understood that the I/O buffer is a single storage location, while the cache buffer typically has multiple storage locations for storing multiple sectors of data. The cache buffer will flush a sector of data when it is necessary to retrieve an additional sector of data, but all cache buffer locations are full.

Although caching systems have improved data handling and processing speed, a primary drawback of such systems is the increase in memory space, and particularly RAM memory space which is conventional in use for cache and I/O buffers. The increase in such memory space increases the costs of the system. Thus, systems having the cache buffer and an I/O buffer for each file in memory utilize a great deal of expensive memory, thus increasing the cost of the system or product in which the system is embodied.

Accordingly, the need exists for an inexpensive system which quickly and efficiently handles the transfer or retrieval of data. Particularly, the need exists for a system having the benefits of cache buffering without the necessity for multiple buffers. The present invention fills these and other needs, and overcomes the drawbacks of the prior art.

SUMMARY OF THE INVENTION

It is an object of the present invention to provide an inexpensive system for handling data transfer.

It is an additional object of the present invention to quickly access data stored in a mass data storage unit.

It is a further object of the present invention to minimize the memory space allocated for use as a buffer.

It is an additional object of the present invention to provide a buffering technique which utilizes a single buffer.

It is an additional object of the present invention to provide a buffering technique having a buffer with multiple storage locations, wherein multiple files can access data from a single one of the buffer storage locations.

It is an additional object of the present invention to manage data temporarily stored in a buffer.

Another object of the present invention is to provide a portable, hand held electronic device having an improved buffering system incorporated therein.

These and other objects are achieved by a system and method for managing data utilizing a single buffer. The system has a processor connected to a mass data storage unit. The mass data storage unit has data, stored in a number of files, organized in a plurality of (sectors in the mass data storage unit. Each file of data has an associated input/output code. A cache buffer, in random access memory, is connected to the processor. The cache buffer has a plurality of buffer storage locations ($B_1, B_2 \ldots B_n$). A plurality of counters ($C_1, C_2 \ldots C_n$) are connected to the processor, wherein each counter corresponds to an associated one of the buffer storage locations.

In a preferred embodiment of the present invention, the system is embodied within a portable hand held electronic device, such as a navigation aid. Particularly, the navigation aid is a global positioning unit having a housing for housing a processor, keypad, display, antenna, a mass data storage unit, the cache buffer having a plurality of buffer storage locations, and a plurality of counters, wherein each counter corresponds to a particular one of the buffer storage locations. As stated, the data stored in the mass data storage unit is organized into files. In the preferred embodiment of a global positioning unit, each file is a map or cartographic file, and there are multiple maps in the mass data storage unit. For example, in one embodiment, a first file is a file of cartographic point data, containing coordinates indicative of the city centers, businesses, points of interest, etc. A second file is a file or cartographic land data, containing coordinates of roads, waterways, boundaries, etc. A third file is a file of cartographic area data, containing coordinates indicative of lakes, metro areas, parks, etc. The data associated with each of these files is stored in the mass data storage unit. The mass data storage unit itself is organized into sectors in conventional fashion.

In operation, as a result of instructions input by a user, via the keypad, or as the result of execution of an instruction set in a processing routine, the processor opens a file, such as the file containing cartographic point data. When it is determined that particular bytes of data are needed for carrying out processing, the processor, in accordance with the principles of the present invention, scans the buffer storage locations of the cache buffer in an effort to determine whether the desired bytes of data are stored in one of the buffer storage locations. Upon initialization of the system, all buffer storage locations are empty, and each counter, associated with its respective buffer storage location, is initialized to zero. Accordingly, upon the need for initial bytes of data to carry out processing, the buffer storage locations in the cache buffer will reveal that the desired bytes of data are not within the cache buffer. In this case, the processor will retrieve all of the data in a particular sector of data from the mass memory storage unit, where the sector of data contains the desired bytes. The retrieved sector of data is stored in a selected one of the buffer storage locations.

Particularly, in accordance with an aspect of the present invention, the buffer storage location in which the retrieved sector of data is stored is the last buffer storage location in the chain of buffer storage locations which is not allocated to a particular file. For example, upon initial processing, with buffer storage locations $B_1, B_2, \ldots B_n$, the data withdrawn from sector, say $S_n$, of the mass data storage unit will be stored in the last buffer storage location of the chain, namely $B_n$. The processor then increments counter $C_n$ to 1, indicating that buffer $B_n$ is allocated to one file. When data is stored within buffer $B_n$, then buffer $B_n$ is deemed to be the matching buffer, and a pointer at the processor is updated to point to the matching buffer $B_n$ to extract whatever data it needs to perform its functions.

Upon further processing, when additional data is needed to carry out processing, the processor scans the cache buffer storage locations to determine whether the needed bytes are already within the cache buffer. When the needed bytes are indeed within the cache buffer, the data is handed directly to the processor for utilization by the processor in the execution of the routine being processed. When, however, the desired data is not within the buffer, the processor de-allocates the currently allocated buffer storage location (e.g., $B_n$) from the open file, moves the de-allocated sector buffer storage location to the beginning of the buffer chain, and decrements the counter associated with the de-allocated buffer. The processor then retrieves the needed sector of data from the mass memory storage unit, stores that data in the last unallocated buffer storage location in the buffer, in this example $B_{n-1}$. That buffer, namely buffer $B_{n-1}$, is deemed to be the matching buffer, and a counter, $C_{n-1}$ is incremented by one to indicate that one file is allocated to the buffer location $B_{n-1}$.

As processing continues, and additional data is needed, the processor scans the buffer storage locations in an effort to determine whether that needed data is within one of the buffer storage locations. As will now be appreciated, at this stage of the example, it could be possible for the data to be located in buffer storage location $B_n$ or $B_{n-1}$. In the event the needed data is located within the currently allocated buffer storage location, namely $B_{n-1}$, the needed data can be handed directly to the processor for processing, and no allocation changes are made. However, in the event the data that is needed is found within the buffer, but at an unallocated location, then the processor de-allocates the currently allocated buffer (e.g., $B_{n-1}$) including moving it to the beginning of the buffer chain, decrements its counter by 1 to indicate that a file has been de-allocated from the buffer storage location, and the processor then allocates the buffer storage location containing the data (e.g., $B_n$) to the file. The processor considers that buffer storage location to be the matching buffer, and thus updates a pointer indicating that the desired data is in the matching buffer, and increments the associated counter ($C_n$) by 1 to indicate that a file is allocated to that location. When, however, the desired data is not within the buffer storage locations, the processor will de-allocate the currently allocated buffer storage location, retrieve the necessary sector of data from the mass data storage unit, store that data in the last unallocated buffer storage location, and allocate the open file to that buffer storage location as previously described.

In accordance with an aspect of the present invention, when all buffer storage locations have a sector of data stored therein, and additional processing requires retrieval of yet another sector of data from the mass data storage unit, the last unallocated buffer storage location will be flushed, and the data retrieved from the mass data storage unit will be stored in that location. In other words, the present invention continuously reorders the buffer storage locations, based upon the allocation/de-allocation process. Thus, that buffer storage location which has been de-allocated the longest, or has been sitting unused the longest period of time, will be flushed as necessary to make room for additional data.

In accordance with another aspect of the present invention, the system is a multi-task system permitting multiple files to be opened at the same time. In accordance with a unique aspect of the present invention, multiple open files may be allocated to the same buffer storage location at the same time. For example, one buffer storage location, say $B_n$, may be allocated to a first file. A second buffer storage location, say $B_{n-1}$, may be allocated to a second open file. As processing continues, it may be determined from the data needed from file 1 is in buffer storage location $B_{n-1}$. In such a case, buffer storage location $B_n$ is de-allocated, put at the beginning of the buffer chain, and the associated counter $C_n$ is decremented by 1. Buffer storage location $B_{n-1}$ would then be allocated to file 1, and counter $C_{n-1}$ would be incremented 1, to 2, indicating that that location is now allocated to 2 files. Carrying this example further, if subsequent processing associated with either open file 1 or open file 2 required data that is not found in the allocated buffer storage location $B_{n-1}$, then buffer storage location $B_{n-1}$ would be de-allocated with respect to the particular file being processed, and the associated counter $C_{n-1}$ would be decremented by 1. However, because, in this example, the buffer storage location $B_{n-1}$ is not completely deallocated, it would not be moved to the beginning of the buffer chain, but would be maintained in its present location within the buffer chain.

In accordance with an additional aspect of the present invention, a user can input data, through use of the keypad (or a keyboard). For example, when the data management cache system of the present invention is incorporated into a portable hand held navigation device, the user may desire to input waypoints of a route that is being planned. In such a case, the user can input waypoints utilizing the keypad of the portable electronic navigation device, and the cartographic data will be modified to include the waypoint. Particularly, the necessary cartographic data will be modified when in the buffer.

In accordance with an aspect of the present invention, when a particular buffer storage location is to be de-allocated from an open file, the processor determines whether the buffer storage location to be de-allocated has been modified, such as by input of waypoint data. When no such modifications have been made, the sector buffer is de-allocated as previously described, and the de-allocated buffer is moved to the beginning of the buffer chain. However, when the processor determines that the data within a sector buffer storage location to be de-allocated has indeed been modified, prior to de-allocation of the buffer, processor writes the data in the sector buffer storage location, including the modified data, to the corresponding sector on the mass data storage medium. The counter associated with the buffer storage location is decremented and, in the event the counter is now zero, indicating that no other open files are allocated to the buffer, the sector buffer chain is adjusted so that the now unallocated buffer storage location is moved to the beginning of the sector buffer chain.

BRIEF DESCRIPTION OF THE DRAWINGS

The objects and features of the invention noted above are explained in more detail with reference to the drawings, in which like reference numerals denote like elements, and in which:

FIG. 1 is a block diagram illustrating hardware components and data flow of a conventional prior art system utilizing cache buffering;

FIG. 2 is a block diagram illustrating hardware components and data flow in accordance with the principles of the present invention;

FIG. 3 is a block diagram illustrating hardware components of a portable handheld electronic device of the present invention;

FIGS. 5a–5f illustrate an example of changes in a chain of buffer storage locations, according to the principles of the present invention.

DETAILED DESCRIPTION OF THE INVENTION

Figure 4A:
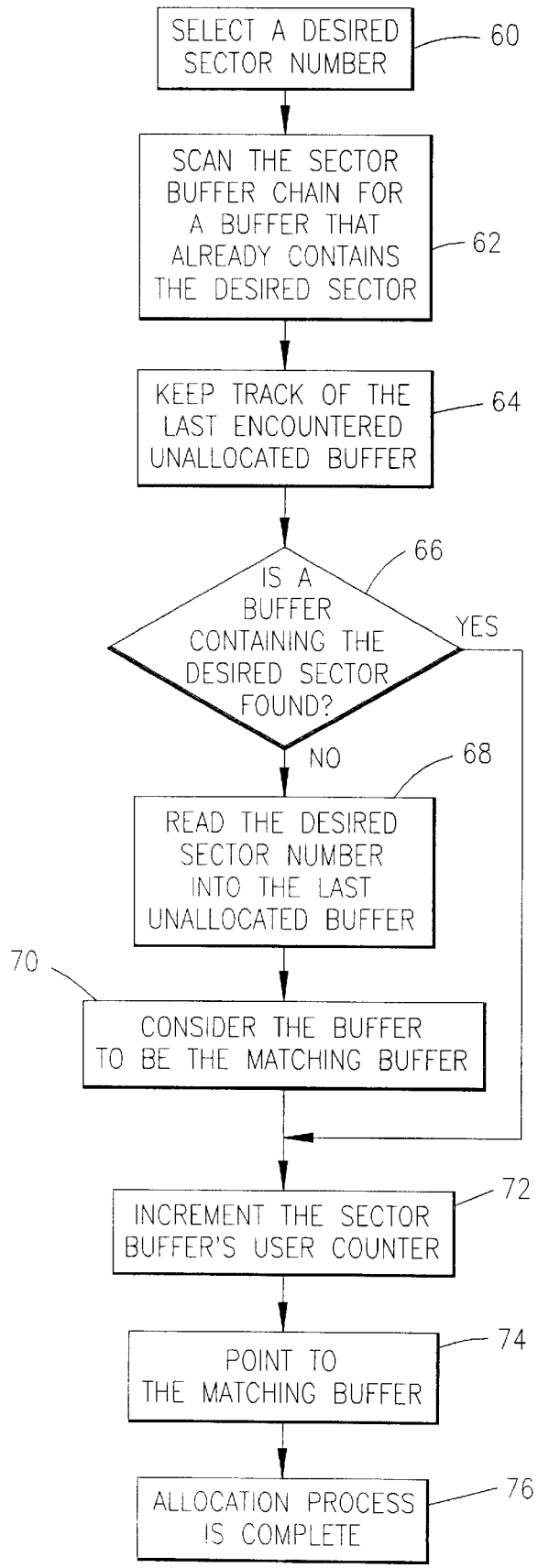
FIG. 4a is a flow chart illustrating processing steps for allocating buffer storage locations in an open file in accordance with the principles of the present invention.

FIG. 1 illustrates a conventional prior art buffering system and configuration. As previously described, a processor 10, a cache buffer 12, a mass data storage unit 14, and a number of input/output (I/O) buffers 16, each of which is associated with a corresponding file 18, are connected as shown. It will be understood that the files 18 are not hardware components, but for purpose of illustration, are shown as a block to illustrate that each I/O buffer is affiliated with an associated file. As will be understood, each file is a set of data. As illustrated, and as described above, processing requiring particular data first checks the I/O buffer for the data, then the cache buffer, and finally accesses the mass data storage unit to retrieve data not found in the buffers. Retrieved data is stored in the cache buffer for possible later use, and is handed to the I/O buffer for current use by the processor.

With reference now to FIG. 2, a system and data flow diagram, designated generally by reference numeral 20, incorporating the buffering aspects of the present invention is shown and described.

System 20 has a processor 22 connected to a cache buffer 24, which is in turn connected to a mass data storage unit 26, as illustrated. The mass data storage unit 26 is organized into sectors, designated $S_1$, $S_2$, $S_3$ . . . $S_n$, in a conventional fashion. Mass data storage unit 26 may be any conventional storage unit, such as a disc, CD ROM, flash memory, etc. As illustrated in FIG. 2, a plurality of files 28, namely, File A, File B, . . . , file n, are utilized in system 20. Again, as previously described, each file contains a set of data. Additionally, in a conventional manner, each file has an associated I/O code. However, unlike the prior art system of FIG. 1, system 20 of the present invention does not include an I/O buffer associated with each file. Accordingly, system 20 has a greatly reduced need for buffer storage space.

With reference now to FIG. 4, a flow chart illustrating the buffering process of the present invention is shown and described.

With reference particularly to FIG. 4a, a flow chart illustrating an algorithm for allocating buffer storage locations with open files is described. At step 60, processor 22 selects a desired sector number of mass data storage unit 26 in a conventional manner. Particularly, as will be understood by those skilled in the art, processing routine being carried out, requires bytes of data from a file in memory 26. In a conventional fashion, processor 22 determines which sector of data in mass data storage unit 26 contains the desired bytes of data. As indicated at steps 62, processor 22 then scans the sector buffer chain of buffer 24 in an effort to locate a buffer storage location, $B_1$–$B_n$ containing the desired sector of data. As indicated at step 64, processor 22 records the last encountered buffer in the chain that is not allocated to an open file.

Particularly, as indicated at step 66, processor 22 determines whether a buffer storage location within buffer 24 contains the desired sector of data. When the desired sector of data is not found in the buffer 24, processor 22 retrieves the desired sector of data, $S_n$, from mass data memory unit 26, and stores the entire data associated with the retrieved sector into the last unallocated buffer, $B_n$, as indicated at step 68. As indicated at step 70, processor 22 then considers the buffer storage location into which the data was just stored to be a matching buffer, and processing advances to step 72.

When, at step 66, it is determined that one of the buffer storage locations $B_n$ contains the desired sector of data, processing proceeds directly to step 72.

At step 72, processor 22 increments the sector buffers user counter $C_n$ to indicate that the buffer $B_n$ has data desired by an open file, and is allocated to the open file. As indicated at step 74, processor 22 then points to the matching buffer, namely that buffer into which sector data was just read, and the allocation process is complete, as indicated at step 76. Accordingly, through utilization of a single buffer 24, and an allocation technique for allocating a buffer storage location to an open file, the necessity for an I/O buffer in addition to the buffer 24 is avoided.

Figure 4B:
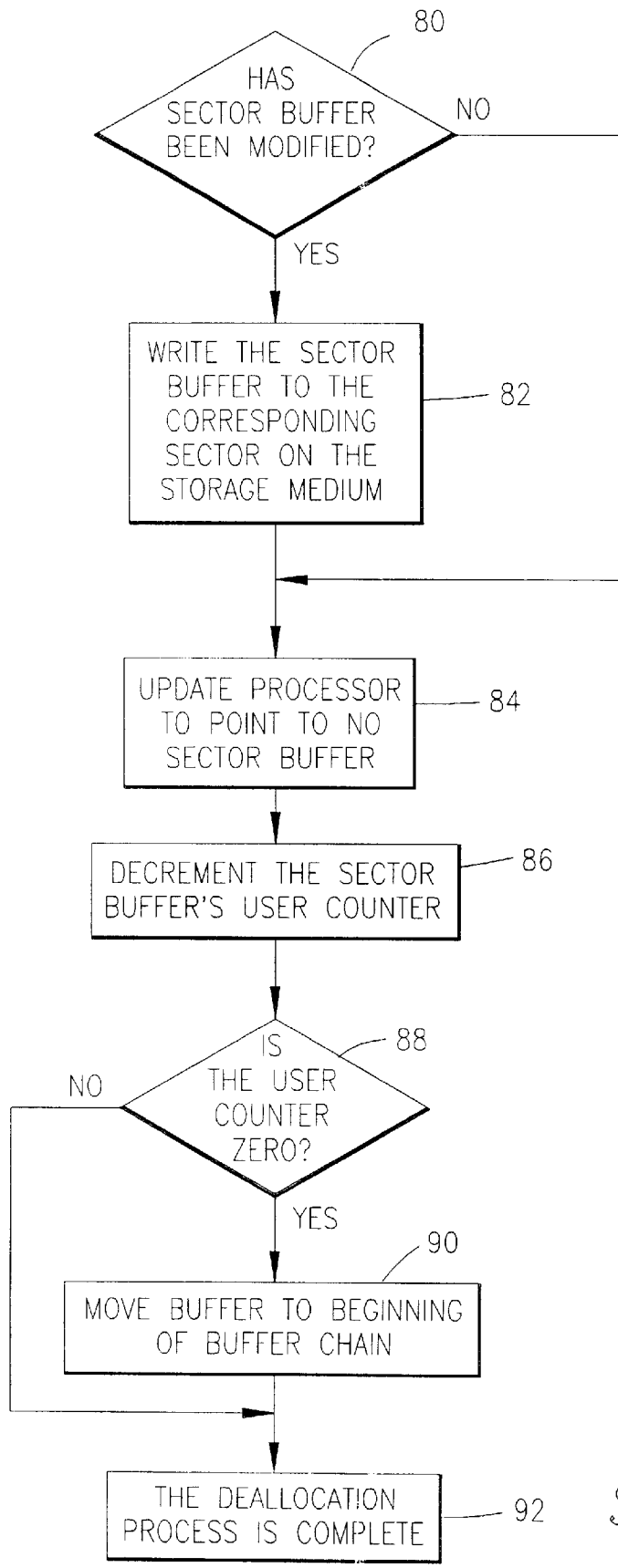
FIG. 4b is a flow chart illustrating processing steps for de-allocating a buffer storage location from an open file in accordance with the principles of the present invention.

With reference now to FIG. 4b, a de-allocation algorithm, for de-allocating a buffer from an open file, is shown and described.

Buffer storage location is de-allocated from an open file when the open file requires data found in a sector other than that which is stored in the buffer storage location to be de-allocated. As indicated at step 80 of FIG. 4b, processor 22 determines whether a sector buffer storage location to be de-allocated as modified. As previously described, modification of data within a particular sector buffer storage location may be modified by a user, such as by input of waypoint data for a planned route. When it is determined at step 80 that the data within the buffer storage location to be de-allocated has not been modified, processing advances to step 84.

When, however, it is determined at step 80 by processor 22 that the buffer storage location to be de-allocated has been modified, processing advances to step 82, where processor 22 writes the data in the buffer storage location to be de-allocated to the corresponding sector of data on the mass data storage unit 26. In this way, the mass data storage unit 26 is modified to include the data indicative of the modification input by the user processing advances to step 84.

At step 84, processor 22 is updated to point to no buffer storage location. At step 86, processor 22 decrements the counter $C_n$ associated with the buffer storage location being de-allocated. At step 88, processor 22 determines whether the counter $C_n$, just decremented, is zero. As previously described, the user counter $C_n$ for a particular buffer storage location is incremented each time the buffer storage location is allocated to a different open file. Accordingly, the case may exist where decrementing the counter in association with the de-allocation process, of FIG. 4b, does not decrement the counter to zero because the buffer storage location being de-allocated is allocated to one or more other open files. In such a case, processing advances to step 92, and the de-allocation process is complete. Particularly, when the counter $C_n$ is not decremented to zero during a de-allocation process, the buffer chain is not adjusted. However, when it is determined at step 88 by processor 22 that the counter $C_n$ has been decremented to zero, processing advances to step 90, where the chain of buffer storage locations is adjusted to move the de-allocated buffer storage location to the beginning of the sector buffer chain. Once the adjustment is completed, processing advances to step 90, and the de-allocation process is complete.

With reference now to FIGS. 5a–5f, an example of the buffering technique of the present invention, and particularly the allocation/de-allocation processes of the present invention, are illustrated.

In FIG. 5a, buffer 24 is illustrated as having five buffer storage locations, $B_1$, $B_2$, $B_3$, $B_4$, and $B_5$. It will be understood and appreciated that buffer 24 could have a different number of buffer storage locations, but five such locations are shown for illustrative purposes. Correspondingly, counter 48 has five counters, $C_1$ through $C_5$, where each counter $C_n$ corresponds to the corresponding buffer $B_n$.

FIG. 5a represents the status of buffer 24 and counter 48 when initialized, at the start of processing. Particularly, all buffer storage locations are empty, as designated by "E", and each counter is initialized to zero, as illustrated.

FIG. 5b illustrates the case where processing requires data located in Sector 1 ($S_1$) in the mass data storage unit 26. Accordingly, as previously described, processor 22, after having scanned buffer 24, and found each storage location empty, retrieves the data of sector $S_1$, and stores it in the last unallocated buffer storage location in the buffer chain, in this case, buffer location $B_5$. Processor 22 then considers buffer storage location $B_5$ to be a matching buffer, increments the corresponding counter $C_5$ to 1, and points to the matching buffer $B_5$, as represented by arrow A. The capital "A" depicted in FIG. 5b represents that a file designated "A" has been opened, and thus FIG. 5b represents that buffer storage location $B_5$, containing data associated with sector $S_1$, has been allocated to file A.

FIG. 5c illustrates the situation where, as the processing continues, it is necessary to de-allocate buffer $B_5$ from file A, and to allocate a new buffer to file A. As previously described, such a situation arises when processing requires data not found in the currently allocated sector ($B_5$). For example, in the case where data bytes required for processing are found in sector $S_2$, processor 22 would determine that file A is currently pointing at a buffer that does not contain sector $S_2$ data.

When processor 22 determines that file A is pointing at a buffer not containing sector $S_2$ data, the current buffer $B_5$ allocated to file A, must be de-allocated. Accordingly, once it is determined that the data $S_1$ has not been modified, buffer storage location $B_5$ is de-allocated starting with processor 22 updating file A to point to no buffer storage location, the corresponding counter $C_5$ is decremented by 1, and, since $C_5$ is now zero, the de-allocated buffer $B_5$ is moved to the beginning of the buffer chain. Processor 22 now begins the allocation process. Processor 22 determines upon a scan of buffer 24 that the desired data is not in buffer 24. Processor 22 then retrieves data associated with section $S_2$ and stores it in the last unallocated buffer storage location, in this case $B_4$. Processor 22 considers buffer storage location $B_4$ as the matching buffer, such that processor 22 points to buffer storage location $B_4$ (with respect to open file A), as illustrated. Corresponding counter $C_4$ is incremented to 1.

In FIG. 5d, the situation is considered where, as processing continues, an additional file, designated by "B", is opened. By way of an example illustrated in FIG. 5d, in the case where it is necessary during processing associated with file "B" to retrieve data bytes found in the sector of data not previously stored in buffer 24, processor 22 retrieves data from the subject sector, say $S_3$, and stores it in the last unallocated buffer storage location, in this case, location $B_3$. As indicated in FIG. 5d, processor 22 updates its pointers such that it recognizes that file A is allocated to buffer storage location $B_4$, and file B is allocated to buffer storage location $B_3$. The counter corresponding to buffer storage location $B_3$, namely counter $C_3$, is incremented to 1, as illustrated.

In FIG. 5e, the situation is illustrated where processing associated with file B requires data bytes found in sector $S_2$. In this case, data associated with sector $S_2$ is already found in buffer 24 during the scanning process performed by processor 22. Accordingly, processor 22 proceeds to de-allocate currently allocated buffer $B_3$ (FIG. 5d) from file B according to the process as previously described, and buffer storage location $B_3$, containing data associated with sector $S_3$, is moved to the beginning of the buffer chain, as illustrated in FIG. 5e. Then, as part of the allocation process with respect to file B, the processor updates its pointer associated with file B to recognize that buffer $B_4$, containing the desired data found in sector $S_2$, is allocated with file B. Processor 22 also updates counter $C_4$ associated with the allocated buffer $B_4$. Thus, in this case, buffer storage location $B_4$ is allocated to both files A and B, and thus, corresponding counter $C_4$ is incremented to 2, indicating that two open files are allocated to buffer storage location $B_4$.

FIG. 5f illustrates the case where, during additional processing, it becomes necessary to de-allocate buffer $B_4$ from file B. Accordingly, the de-allocation algorithm is performed, such that file B is no longer allocated with buffer $B_4$. As will now be understood, as part of that process, the corresponding counter $C_4$ is decremented by 1. However, as illustrated in FIG. 5f, since the counter $C_4$ is not decremented to zero, due to the fact that buffer $B_4$ is still allocated to open file A, buffer $B_4$ is not moved to the beginning of the buffer chain.

In view of the foregoing, it will now be apparent that the present invention provides a unique system and method for data management, and, particularly, for the buffering of data. By combining buffering typically associated with cache and file I/O buffers into a common pool of buffer storage locations, buffering requirements are reduced to a single buffer, thereby reducing the memory space required for buffering purposes.

Figure 6:
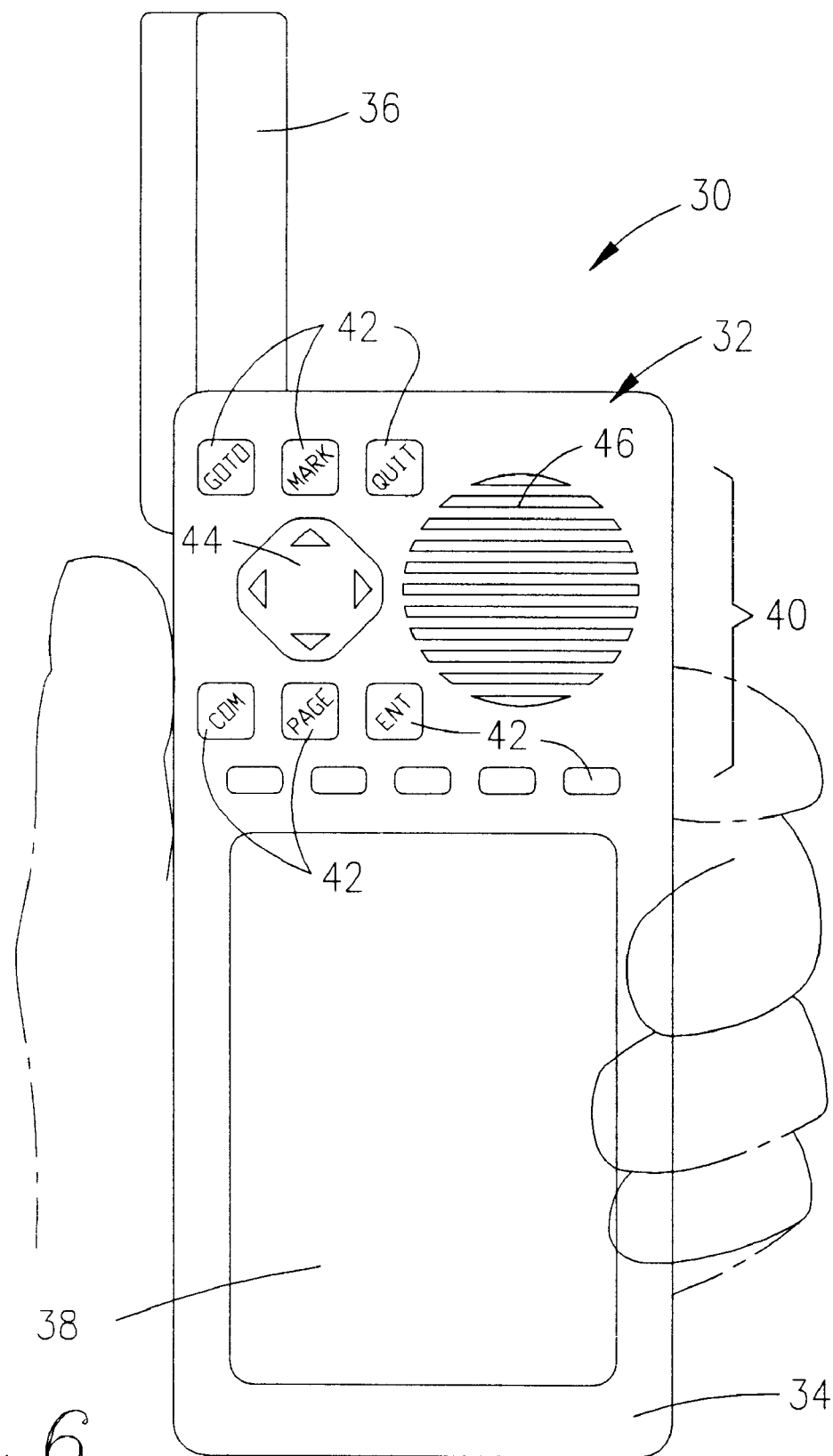
FIG. 6 illustrates a portable hand held electronic device of the present invention.

With reference now to FIGS. 3 and 6, FIG. 6 illustrates a portable electronic device (generally designated by the reference numeral 30) according to the present invention. An electronic device 30 of FIG. 6 is oriented along a vertical or horizontal axis, such as when held by a user, as illustrated in the vertical mode in FIG. 6. The portable device 30 includes a housing 32, having a face plate 34, and side walls and a back wall (not shown) Portable electronic device 30 further includes an antenna 36 mounted at one corner of the housing 32.

The face plate 34 is substantially rectangular in shape. The face plate 34 securely receives a display screen 38, and a control panel 40. The control panel 40 includes a plurality of push button type keys 42, which afford the user control over the portable device 30. Optionally, a directional toggle pad 44 may be included within the control panel 40. In one application, such as when utilizing the portable device within a global positioning system, the toggle pad 44 affords the ability to scan through a large map stored in a memory of the portable electronic device 30, and to access and display portions of the scanned map on the screen 38 in accordance with the principles of the present invention. Optionally, the panel 40 may include a speaker/microphone combination, represented by reference numeral 46, to afford communication.

With reference now to FIG. 3, an electronic circuit of the portable electronic device 30 is illustrated in block form. The electronic circuit incudes the processor 22, cache buffer 24, and mass data storage unit 26, as previously described with reference to FIG. 2. Mass data storage unit 26 is organized into sectors, $S_1, S_2, S_3, \ldots S_{n-1}, S_n$. The mass data storage unit 26 contains data organized into various files. As described above, in accordance with an embodiment of the present invention being an electronic navigation aid, each file contains data pertaining to a map. For example, the first file, file 1, may contain data indicative of cartographic point features. The second file, file 2, may contain data indicative of cartographic line features. A third file, file 3, may contain data indicative of cartographic area features. Other data files, associated with other functions or purposes, may also be included, as will be readily understood and appreciated by those with skill in the art.

Cache buffer 24 is divided into a number of buffer storage locations, represented by storage locations $B_1, B_2, B_3 \ldots B_n$. A plurality of counters $C_1$–$C_n$, designated generally by reference numeral 48, are connected to processor 22. Processor 22 communicates via the control panel, designated as keypad 50, via line 51. The processor 22 communicates via line 37 with display screen 38. The antenna 36 is connected to processor 22 via line 35. Processor 22 is connected to mass data storage unit 26 via line 25, processor 22 is connected to counter 48 via line 47, and processor 22 is connected to cache buffer 24 via line 23. The electronic circuitry of portable electronic device 30 is powered by the power source (not shown), in a conventional manner.

Housing 32 of portable electronic device 30 houses processor 22, cache buffer 24, mass data storage unit 28, display screen 38, and keypad 50, where display screen 38 and keypad 50 are accessible at the exterior of the housing. In a preferred embodiment, portable electronic device 30 is utilized in conjunction with a global positioning system, for acquiring signals transmitted from satellites in geosynchronous orbit. In such an embodiment, processor 22 includes means for calculating, by triangulation, the position of the portable electronic device 30. As stated, in such an embodiment, at least one of the files previously referenced is an image file, indicative of a selected map, stored in mass data storage unit 26.

Accordingly, an operator of portable electronic device 30 controls processor 22 through use of the control panel 40 to display map images on display screen 38. Utilizing control panel 40, the operator selects areas of the map to be displayed and data, indicative of the map to be displayed, is accessed from mass data storage unit 26, or cache buffer 24, according to the principles of the present invention.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method of buffering data in a system having a memory, organized into sectors, with a plurality of files of data stored therein, a processor connected to said memory, a buffer having a plurality of buffer storage locations organized in a chain, said buffer connected to said processor, and a plurality of counters wherein each said counter corresponds to one of said buffer storage locations, said method comprising:

(a) selecting a said sector of said memory containing desired data associated with an open one of said files;

(b) scanning the buffer storage locations to determine whether said desired data is in said buffer;

(c) keeping track of a selected buffer storage location that is not allocated to a file;

(d) when the desired data is not found within a buffer storage location, reading the desired data from said selected sector of said memory into said selected unallocated buffer storage location;

(e) considering said buffer storage location into which data of said selected sector was just stored as a matching buffer storage location for said open file;

(f) pointing said processor to said matching buffer storage location; and (g) retrieving said selected data from said matching buffer storage location for processing by said processor.

2. The method as set forth in claim 1 further comprising:

incrementing the said counter corresponding to said buffer storage location considered the said matching buffer storage location.

3. The method as set forth in claim 2 further comprising:

(a) selecting an additional said sector of said memory containing additional desired data associated with said open one of said files;

(b) scanning the buffer storage locations to determine whether said additional desired data is in said buffer;

(c) keeping track of a selected buffer storage location that is not allocated to a file;

(d) when the desired data is not found within a buffer storage location, de-allocating the buffer storage location currently considered as the matching buffer storage location;

(e) reordering the location of said buffer storage locations such that said de-allocated buffer storage location moves to the beginning of said chain of buffer storage locations;

(f) reading said additional desired data from said selected sector of said memory into said selected unallocated buffer storage location; and (g) repeating steps (e)–(g) of claim 1.

4. The method as set forth in claim 3 further comprising:

decrementing the said counter corresponding to the said buffer storage location that is de-allocated.

5. The method as set forth in claim 4, wherein said open file is a first open file, said method further comprising the steps of:

opening a second said file;

selecting a said sector of said memory containing desired data associated with said second open file; and repeating steps (c)–(g) of claim 1 with respect to said data associated with said second open file.

6. The method as set forth in claim 5 further comprising:

incrementing the said counter corresponding to the said buffer storage location considered the said matching buffer storage location with respect to said second open file.

7. The method as set forth in claim 6 further comprising:

selecting an additional said sector of memory containing additional desired data associated with said second open file;

scanning the buffer storage locations to determine whether said additional desired data with respect to said second file is in said buffer; and keeping track of a selected buffer storage location that is riot allocated to a file.

8. The method as set forth in claim 7 further comprising:

when the said desired data associated with said second open file is not found within a buffer storage location, de-allocating the buffer storage location currently considered as the matching buffer storage location with respect to said second open file;

decrementing the said counter associated with said de-allocated buffer storage location with respect to said second open file; and when said decremented counter is a selected minimum value, reordering the locations of said buffer storage locations such that said de-allocated buffer storage location with respect to said second open file is moved to the beginning of said buffer chain.

9. The method as set forth in claim 7 further comprising:

when the said desired data associated with said second open file is found within the buffer storage location considered the said matching buffer storage location with respect to said first open file, de-allocating the buffer storage location currently considered said matching buffer storage Location with respect to said second open file;

decrementing the said counter associated with said de-allocated buffer storage location with respect to said second open file;

when said decremented counter is a selected minimum value, reordering the locations of said buffer storage locations such that said de-allocated buffer storage location with respect to said second open file is moved to the beginning of said buffer chain;

considering said buffer storage location containing said desired data with respect to said second open file to be a matching buffer storage location with respect to said second open file;

updating said processor to point to said buffer storage location considered said matching buffer storage location with respect to said second open file; and incrementing said counter associated with said buffer storage location considered said matching buffer storage location with respect to said second file.

10. The method as set forth in claim 7, further comprising:

when the said desired data associated with said second open file is found within the buffer storage location considered the said matching buffer storage location with respect to said second open file, retrieving said desired data from said matching buffer storage location with respect to said second open file for processing of said desired data.

11. The method as set forth in claim 2, wherein said the step of de-allocating said buffer storage location further comprises:

determining, prior to de-allocating the buffer storage location, whether data in said buffer storage location has been modified; and when it is determined that the data in said buffer storage location to be de-allocated has been modified, writing the data within said buffer storage location, including said modification, to the said sector of said memory to which said data corresponds.

12. A system for buffering data associated with a plurality of files, said system comprising:

a mass data storage unit for storing said data, said mass data storage unit organized into a plurality of sectors;

a single buffer having a plurality of buffer storage locations organized in a chain;

a plurality of counters, each said counter corresponding to one of said buffer storage locations;

a processor, having a pointer, said processor connected to said mass data storage unit, said buffer, and said counters, wherein said processor (a) selects a said sector of said mass data storage unit containing desired data associated with an open one of said files, (b) scans said buffer storage locations to determine whether said desired data is in said buffer, (c) reads said desired data from said selected sector of said mass data storage unit into a selected buffer storage location when said processor determines, as a result of scanning, that said desired data is not within said buffer and, (d) allocates said selected buffer storage location to said open file.

13. The system for buffering data as set forth in claim 12, wherein said selected buffer storage location is a last buffer storage location in said chain that is not allocated to an open file.

14. The system for buffering data as set forth in claim 13, wherein said processor selects an additional said sector of said mass data storage unit containing additional desired data associated with said open file, said processor scans said buffer storage locations to determine whether said additional desired data is in said buffer, and when said additional desired data is not found within a buffer storage location, said processor de-allocates said selected buffer storage location currently allocated to said open file, reads the data associated with said additional said sector into a next selected buffer storage location, and allocates said open file to said next selected buffer location.

15. The system as set forth in claim 14, wherein said open file is a first open file, wherein said processor opens a second said file, selects a said sector of said mass data storage unit containing the desired data associated with said second open file, scans said buffer storage locations to determine whether said desired data with respect to said second open file is within said buffer, reads the data from said selected sector associated with said second open file into a selected buffer storage location that is not allocated to an open file, and allocates said selected buffer storage location into which said data was just read with said second open file.

16. The system as set forth in claim 15, wherein the said counter associated with a buffer storage location allocated to an open file is incremented when said associated buffer storage location is allocated, said counter being decremented when its said associated buffer storage location is deallocated from said open file.

17. The system as set forth in claim 16, further comprising:

a display connected to said processor;

a keypad connected to said processor; and a housing for housing said processor, said counters, said buffer, said mass data storage unit, said display, and said keypad.

18. The system as set forth in claim 17, wherein said system is incorporated in a portable electronic device.

19. The system as set forth in claim 18, wherein said portable electronic device is a navigation aid.

* * * * *